Dec. 14, 1926.
W. R. MYERS
FODDER SOAKER
Filed July 21, 1925
1,610,306
2 Sheets-Sheet 1
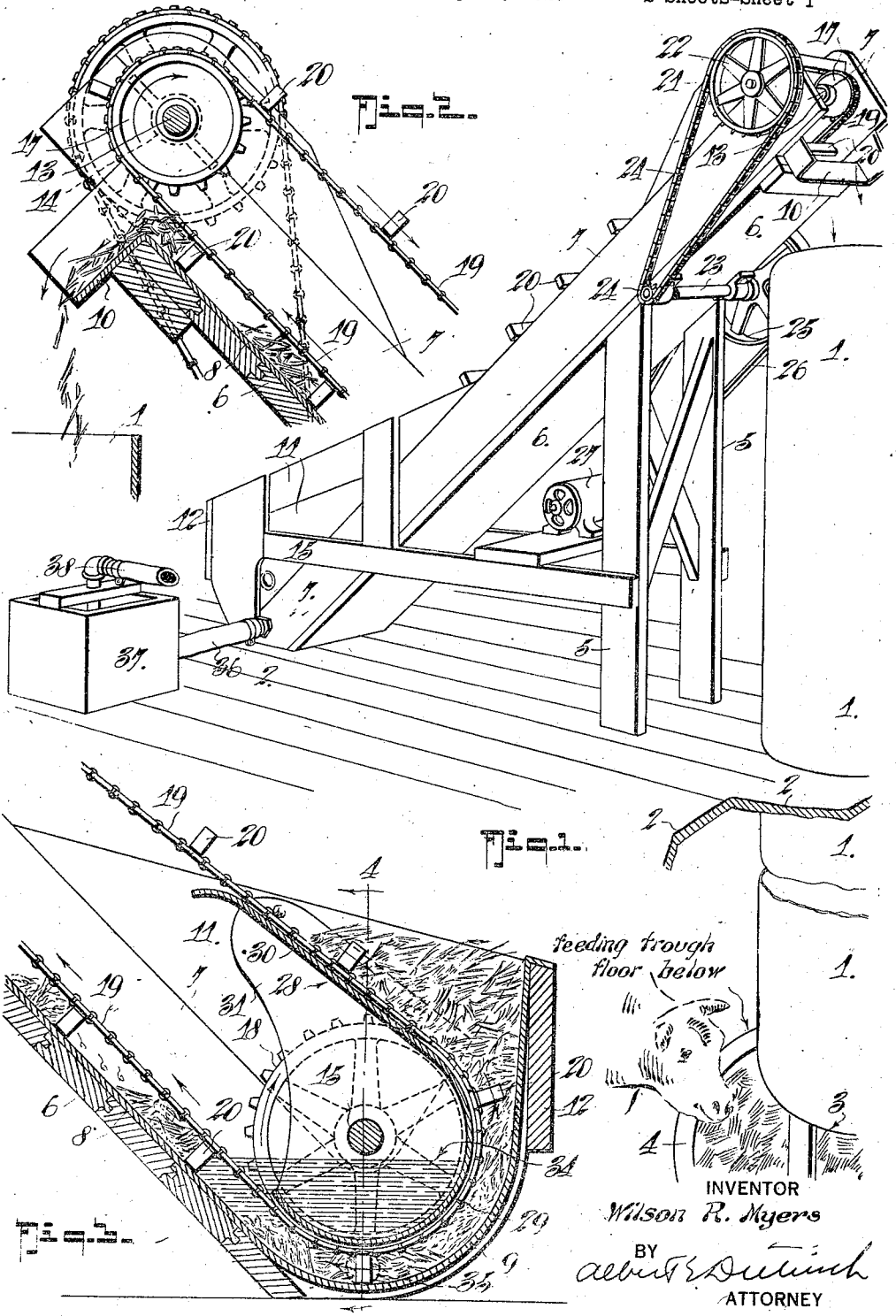
INVENTOR
Wilson R. Myers
BY
ATTORNEY Dec. 14, 1926.
W. R. MYERS
FODDER SOAKER
Filed July 21, 1925
1,610,306
2 Sheets-Sheet 2
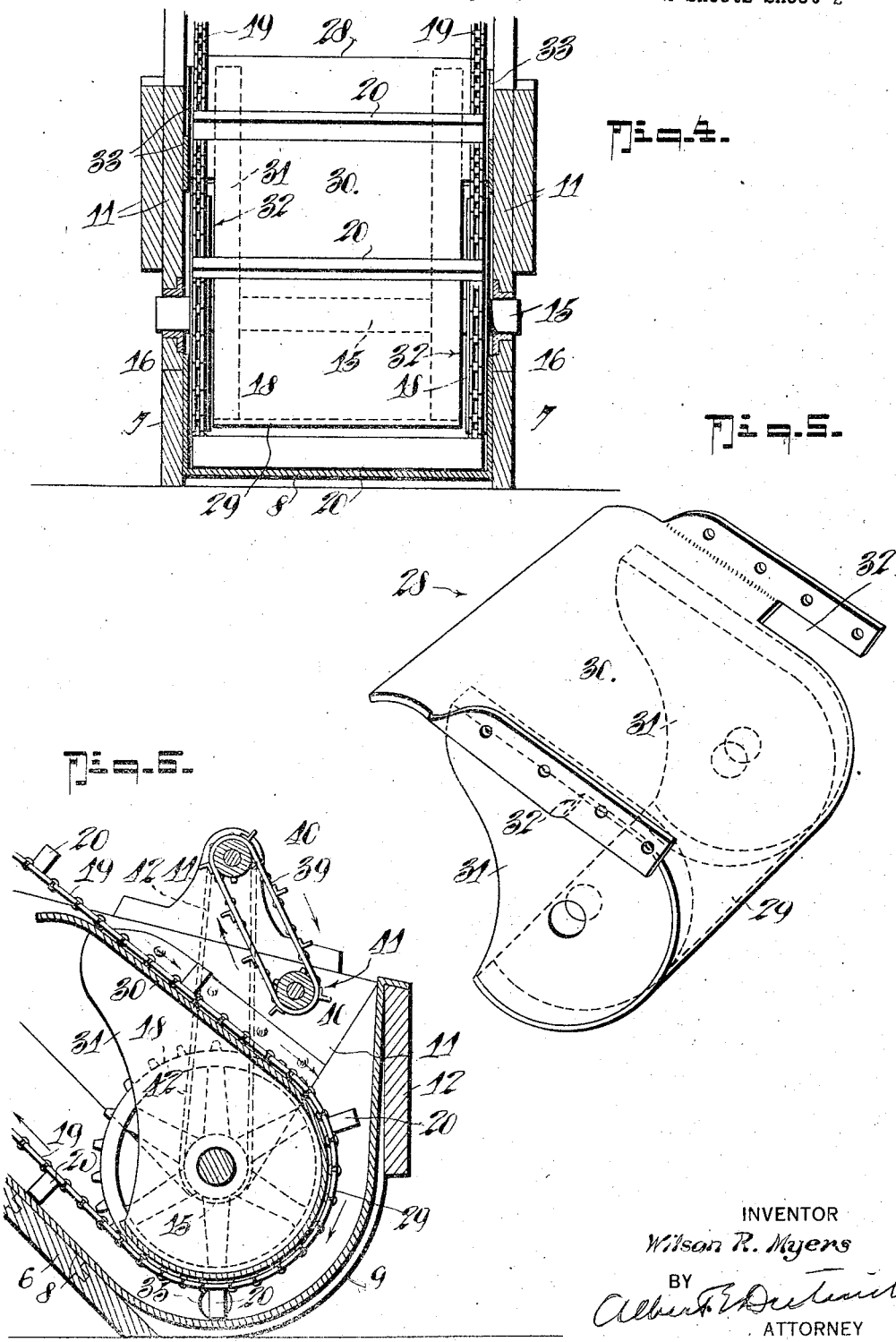

Patented Dec. 14, 1926.

1,610,306

UNITED STATES PATENT OFFICE.

WILSON R. MYERS, OF PORTLAND, OREGON.

FODDER SOAKER.

Application filed July 21, 1925. Serial No. 45,126.

The invention has for its object to provide a simple structure efficiently operable for the purpose of thoroughly and uniformly soaking cattle fodder as an incident to the preparation thereof as a high grade feed.

The invention is adaptable to be used in connection with and is an improvement over a well known method of cattle feed preparation. In this method referred to an open ended receiving tube is used and is vertically positioned, preferably with its upper or receiving end extending up through a hay mow floor, for facilitating the filling of fodder thereinto, and its lower discharge end extending below to the feeding floor in cooperative relation with a feeding trough for discharging its contents thereinto gradually as needed. The fodder or roughage is filled into the tube and is sprayed with water in which is a quantity of a suitable converter designed to restore to the roughage its moisture and to convert the starch therein to sugar. A heavy weight is then lowered upon the mass in the tube and allowed to exert its pressure thereon. In this manner, in a period of twenty to thirty hours, the starches contained in the mass will have been converted into maltose or sugar and a temperature of about 145° created therein, thus providing a very desirable feed approximately 85 per cent predigested.

As the digestive powers of animals are but approximately fifty per cent as efficient as those of humans, a treatment of their food having the character above described is most desirable.

In the system above outlined the weights used range between 1600 to 2000 pounds and the great difficulty with which they are handled and the expense of their production is one of the factors hindering a commercial use proportionate to the possibilities of the system. Also, by hose moistening or spraying the dry fodder or roughage in the tube the liquid follows certain channels through the same and does not effectively or uniformly moisten the same. It is also true that great quantities of the liquid courses all the way through the tube and into the feeding trough.

My invention serves as a complete remedy for the deficiencies referred to and by the use thereof the roughage or fodder is so thoroughly and uniformly moistened with converter liquid that when it is filled into the tube referred to it will so compact itself as to entirely eliminate the need for a presser weight. In this manner also, all of the roughage is uniformly soaked and the liquid does not freely run down into the feeding trough.

With the above and other objects in view that will hereinafter appear the invention further resides in the novel details of construction, combination and arrangement of parts all of which will be first fully described in the following detailed description, then be particularly pointed out in the appended claims, reference being had to the accompanying drawings, in which:—

Figure 1 is a perspective view illustrating the invention in use.

Figure 2 is a detail longitudinal section of the upper or discharge end of the conveyor.

Figure 3 is a view similar to Figure 2 of the lower or receiving end of the conveyor.

Figure 4 is a vertical cross section taken on the line 4 on Figure 3.

Figure 5 is a detail perspective view of the fodder director and guard plate.

Figure 6 is a view similar to Figure 3 and illustrates a slight modification of the invention.

In carrying out the principles of my invention I provide a preparer tube 1 which is in the nature of an open ended cylindrical body vertically positioned and extending downwardly through the floor 2 of a hay mow to have its lower or discharge end 3 in cooperative relation above the feeding floor below, where it is suitably supported in cooperative relation with the animal feed trough 4. The tube 1 is in the nature of a reservoir for receiving animal fodder or roughage which has been moistened with a converter suitable for converting the starches contained in the said fodder to maltose or sugar by fermentation while contained in such tube or reservoir and fed as needed, by gravity action, into the feeding trough 4 through the discharge end 3 thereof.

The methods of thus preparing animal food are well known and it is common to fill tubes of the description above given with fodder or roughage, suitably moisten the same, and to subject the same to pressure exerted by a weight inserted into the upper end of the tube for compacting the mass and substantially excluding free admission of air thereto, so that the mass will ferment and by heat generation be warmed and predigested in a great degree so as to prepare the same for consumption by the animals to be fed and in condition considerate of their limited digestive capacity.

In such systems as are above referred to, the present known methods of preparing or moistening the fodder and the use of the very heavy weights for compacting the mass hinder the broad commercial use of these systems because of the difficulties they present. The handling of the weights is a very troublesome function and when the present known methods of moistening the fodder are utilized a uniform moistening thereof is practically impossible, as the water or other liquid directed into the upper end of the tube follows certain channels through the fodder, leaving some portions of the same entirely dry and moistening portions that it does contact ineffectually. In this manner it is also common to have the water filter through the tube and into the feeding trough 4 in great quantities, which is obviously troublesome.

To the overcoming of the above mentioned difficulties this invention is addressed and I have disclosed in this application a structure whereby the fodder or roughage may be moistened in an effectual and absolutely uniform manner and so deposited into the preparer tube 1, in its uniformly moistened condition, as to render possible the desired preparation of the material for animal consumption without the necessity of the use of any weights or compacting mediums whatever.

In carrying out the features mentioned generally above I provide, supported upon suitable framing standards 5, a conveyor trough 6 having confining sides 7 and the bottom of which inclines upwardly at an angle of approximately 45° from the lower or entrant end thereof to the upper or discharge end thereof. The trough is provided with a metal liner 8 which is turned up at its lower or entrant end, as at 9, to provide a liquid receptacle and is turned downwardly at its upper end, and short of the ends of the side boards 7, as at 10, to provide a discharge throatway adapted to be positioned in the manner illustrated in Figures 1 and 2 of the drawings for readily discharging into the upper end of the preparer tube 1.

The side boards 7 are built up at the lower ends thereof, as at 11, and a cross board 12 provided across the ends thereof to form a relatively deep receiving end for the trough-like body for a purpose later to be described.

An upper cross shaft 13 is provided and has suitable bearing, as at 14, in the upper ends of the side boards 7, and a lower cross shaft 15 is also provided and has suitable bearing, as at 16, in the lower or entrant end of the trough-like body, see Figures 2 and 3. The upper shaft 13 has securely mounted thereupon a pair of sprockets 18, each thereof being positioned adjacent the respective side board 7, and the lower shaft 15 is also provided with a pair of similarly positioned sprockets 18, the latter, however, preferably being of a larger diameter than the sprockets 17. A pair of endless conveyor chains 19 take over the sprockets 17 and 18 at the respective sides of the trough-like body and the said chains 19 are provided with cross slats 20 so that the pair of chains and the slats together provide a slatted conveyor.

To provide for the proper driving of the slatted conveyor one end of the upper shaft 13 may be extended, as at 21, and provided with a sprocket 22 which may be driven from the countershaft 23 by suitable power transmission agencies 24, the countershaft 23 being itself moved through the pulley and belt transmission 25—26 from the driving motor 27 supported on the supporting framing for the trough-like body, see Figure 1 of the drawings.

Cooperative with the lower sprocketed shaft 15 and that portion of the endless slatted conveyor passing therearound, I provide a fodder director and guard plate 28 which includes a curved portion 29 curved to conform concentrically to the lower end travel of the slatted conveyor and having a flat table portion 30 for receiving the fodder or roughage as it is filled into the entrant end of the trough-like body.

The director 28 is mounted in the position mentioned by reason of being secured to the mounting side boards 31 each of which is provided with an aperture through which the shaft 15 may pass, so that the said body may be mounted directly upon the said shaft, and cut out portions or slotways 32 are provided in the body laterally of the position of the side boards 31, and which are adapted to accommodate the positioning and movement of the sprockets 18 and the lower end of the slatted conveyor which takes thereover, and securing flanges 33 which may be secured to the sides 11 in the manner indicated in Figure 3 of the drawings. See also Figures 4 and 5.

It will be observed, by reference to Figure 3 of the drawings, that by reason of the manner of shaping the lower end of the liner 8 and the manner of positioning the sprocketed shaft 15 and the director body 28 cooperatively therewith, a restricted travel space is provided for the fodder or roughage which said space is of a width substantially equivalent to the width of the conveyor slats 20.

The receptacle formed by upwardly bending the lower end of the liner 8, as at 9, is adapted to be filled with the liquid converter, indicated by the numeral 34, and the said liquid converter is admitted into the said receptacle through the connection 35 adjacent the bottom at one side thereof.

It will be obvious, by reference to Figure 3 of the drawings, that the roughage or fodder thrown into the entrant end of the trough-like body and upon the flat table portion 30 of the body 28 will be acted upon by the down travelling slats 20 and carried down and around through the restricted passage under the liquid converter 34, the said body 28 serving to cause all of said fodder to so travel and permitting none thereof to pass into engagement with the up travelling slats 20 without being caused to pass down and under the said liquid converter. It will be obvious, of course, that the fodder may be thrown into the entrant end of the trough-like body in any approved manner and it will be found very effective to position the discharging end of any suitable roughage cutting implement so that the same will discharge directly into the said entrant end.

It is, of course, desired to maintain the level of the liquid converter in the receptacle at approximately that indicated in Figure 3 of the drawings, and to accomplish this purpose I connect the inlet 35, through the piping connection 36, with any suitable control box 37 in which is provided any suitable float control for maintaining the level desired, the liquid converter being supplied to that control box through the conduit connection 38 from any source of supply, such as a tank or the like, (not shown).

The slatted conveyor is moved relatively slowly and the fodder directed downwardly through the restricted passageway through the liquid converter path will be carried up the metal lined incline to be discharged through the discharge trough 10 into the upper end of the preparer tube. In this manner, all of the fodder or roughage is effectively and uniformly soaked and as the conveyor slats convey the portions thereof up the said incline in the manner indicated in Figure 3 of the drawings any surplus moisture over that necessary for the desired moistening will be allowed to trickle back down the said incline into the receptacle.

In Figure 6 of the drawings, I have illustrated a slight modification of the invention. When the fodder or roughage is being fed into the entrant end of the trough-like body in shovel or fork fulls the feeding will not be systematic and uniform but will be in intermittent bulks. To provide for the desired constant and smooth feeding of the material through the liquid converter path an auxiliary control conveyor 39 may be provided in the nature of an endless slatted belt which takes around the rollers 40, the trunnions of which may have suitable bearing, as at 41, upon and in the side boards 11. One of the trunnions of the rollers 40 may be extended and provided with a small sprocket and one end of the shaft 15 may be likewise extended and sprocket provided so that rotative motion from the last mentioned shaft may be imparted to the roller having the sprocketed extension through the power transmission connection 42.

From the foregoing description, taken in connection with the accompanying drawings, it is thought the novel details of construction, the manner of operation and the advantages of my invention will be readily understood by those skilled in the art to which it relates.

What I claim is:

1. In an apparatus for soaking fodder and delivering it to a reservoir of the character embodying a supporting trough sustained at an inclination to the horizontal and embodying an endless chain slatted conveyor mounted within the trough and adapted to drag the fodder through liquid located in the lowermost portion of the trough up along the bottom of the trough to the delivery end, said conveyor including a shaft with spaced sprockets located at the receiving end; a director comprising a flat plate and a cylindrical portion with sides having apertures for said shaft and adapted to fit between the pair of sprockets, said director including side wings, and means securing said side wings to the sides of the trough.

2. In an apparatus for soaking fodder and delivering it to a reservoir of the character embodying a supporting trough sustained at an inclination to the horizontal and embodying an endless chain slatted conveyor mounted within the trough and adapted to drag the fodder through liquid located in the lowermost portion of the trough up along the bottom of the trough to the delivery end, said conveyor including a shaft with spaced sprockets located at the receiving end; a director comprising a flat plate and a cylindrical portion with sides having apertures for said shaft and adapted to fit between the pair of sprockets, said director including side wings, means securing said side wings to the sides of the trough, and a second endless slatted conveyor mounted above and in cooperative relation with the lower end of the first mentioned conveyor for regulating the loading of the fodder thereupon, said director plate extending beneath the adjacent parts of said conveyors.

WILSON R. MYERS.